April 8, 1969  F. I. BUTAEV ETAL  3,437,863
HIGH-VOLTAGE MERCURY-ARC RECTIFIER
Filed July 29, 1965  Sheet 2 of 2

United States Patent Office 3,437,863
Patented Apr. 8, 1969

3,437,863
HIGH-VOLTAGE MERCURY-ARC RECTIFIER
Filipp Ivanovich Butaev, Krasnokazarmennaya ulitsa 19, kv. 43; Nikolai Semenovich Klimov, Krasnokazarmennaya ulitsa 19, kv. 94; Alexei Alexandrovich Pertsev, Krasnokazarmennaya ulitsa 19, kv. 136; Nikolai Pavlovich Stepanov, Sadovo-Sukharevskaya ulitsa, 2/34, kv. 6; Alexandr Mikhailovich Shemaev, Metrosroevskaya ulitsa 9, kv. 3; and Ilya Dmitrievich Shkolin, B. Spasskaya ulitsa 7, kv. 15, all of Moscow, U.S.S.R.
Filed July 29, 1965, Ser. No. 475,833
Int. Cl. H01j 13/34, 13/26, 13/32
U.S. Cl. 313—167
4 Claims

ABSTRACT OF THE DISCLOSURE

A high voltage mercury arc rectifier which has a housing with channels for the passage of a coolant, which channels increase in size from inlet to outlet so that a higher rate of coolant flow can be obtained at the inlet in comparison with the outlet to prevent formation of a film between the coolant and the housing walls. Also provided is an evacuation system for the housing which includes a valve controlled by an electromagnetic drive. A slot igniter is mounted in a cathode in the housing and is sealed in the cathode by a soft iron wire which is sandwiched between hard metal portions of the cathode and igniter.

---

The present invention relates to a high-voltage mercury-arc rectifier, more particularly, to the design of the housing of a high-power liquid-cooled rectifier.

There are known high-voltage mercury-arc rectifiers comprising a housing with channels for coolant; an anode chamber mounted in the upper part of the housing; main anode insulator fixed on the anode chamber; a cathode; an anode; an anode cooler; intermediate electrodes arranged in the anode chamber; a filter and excitation anodes, arranged in the housing; grids arranged between the intermediate electrodes and filter, a voltage divider; a slot igniter and an evacuation system mounted on the housing of the rectifier.

However, the design of the housing for the above-mentioned high-voltage rectifiers does not provide for optimum mercury-vapor conditions and high strength of the rectifier within the rated load and above. Therefore a load increase results in a rise of mercury vapor density which causes malfunction of the rectifier at a high-voltage operation.

Another disadvantage of the above-mentioned high-voltage mercury-arc rectifier is that the high-vacuum cock of the evacuation system is provided with a hand drive, which complicates the operation of the rectifiers.

Besides, an aluminum seal between the slot igniter and the cathode can be destroyed due to the action of mercury which also disturbs the normal operation of the rectifier.

The primary object of the invention is to provide a high-voltage mercury-arc rectifier which permits substantial increase of power and rectifier strength, as well as insures reliable operation of the rectifier at considerable overloads.

In accordance with the invention, in the accomplishment of said object and with the purpose of increasing the rate of flow of coolant, the coolant channels of the cooling jacket of the housing of a high-voltage mercury-arc rectifier channels are made variable in section through the height of the housing, the sectional area increasing from inlet to outlet, to ensure a specified rate of the coolant flow, e.g. 120 cm./sec. at the inlet and 70 cm./sec. at the outlet, and thus to preclude the formation between the liquid and the housing walls of a film reducing the cooling efficiency.

The high-vacuum cock of the evacuation system mounted on the housing is provided with an electromagnetic drive comprising a low-carbon steel core, a guide sleeve for said core, a valve hinged to the core rod, and a pressure spring.

Besides, the seal between the slot igniter and cathode is made of soft iron wire, and the sealing surfaces of the cathode and igniter are coated with a hard metal.

Figure 1:
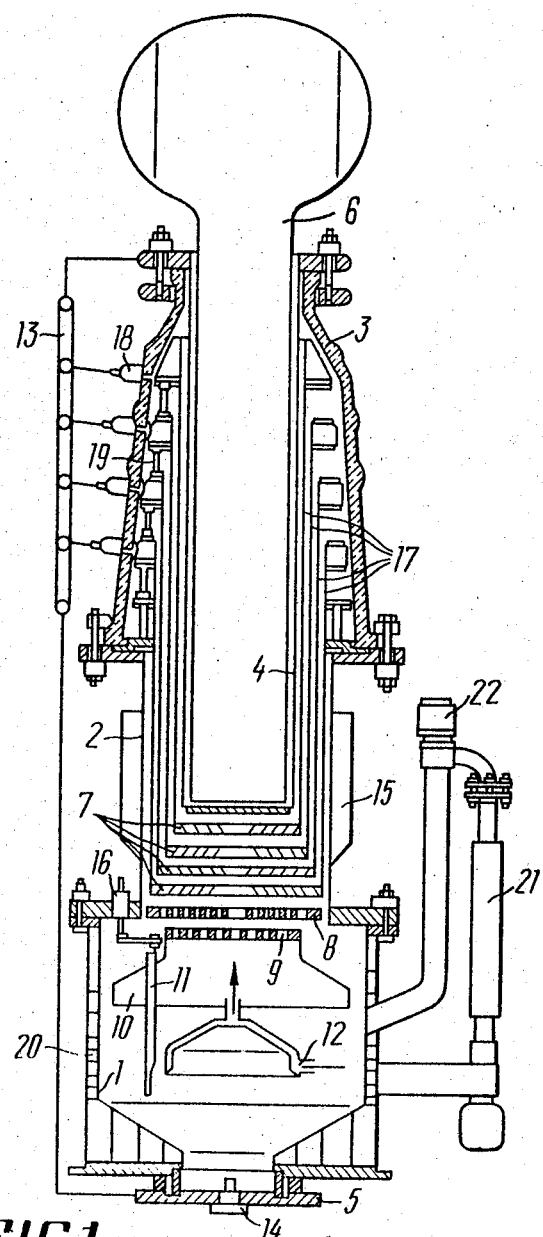
Figures 2, 3:
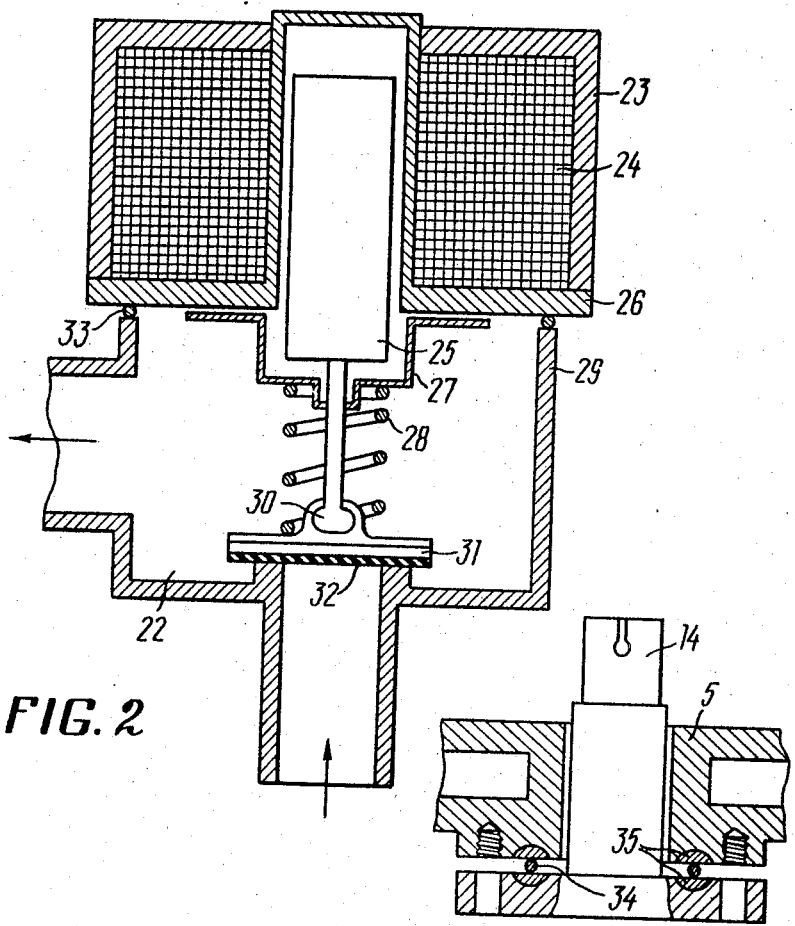

An embodiment of the present invention is given by way of illustration and represented in the accompanying drawings, wherein:

FIG. 1 schematically shows a sectional view of the high-voltage mercury-arc rectifier;

FIG. 2 shows in section a high-vacuum cock of the evacuation system with an electromagnetic drive; and FIG. 3 is a sectional view of the slot igniter of the rectifier.

A high-vacuum mercury-arc rectifier comprises the following units: housing 1 (FIG. 1), anode chamber 2, main anode insulator 3, anode 4, cathode 5, cooler 6, intermediate electrodes 7, grids 8, filter 9 with cone 10, excitation anodes 11, cathode cap 12, voltage divider 13 and slot igniter 14.

Referring to FIG. 1, anode chamber 2 is mounted on the top flange of housing 1 and provided with ribs 15 for cooling. Main anode insulator 3, in its turn, is mounted on the top plate of anode chamber 2. Terminals 16 of excitation anodes 11 as well as other terminals of auxiliary electrodes, e.g. of grids (not shown in FIG. 1), are passed through the bottom plate of anode chamber 2.

Voltage divider 13 is connected with anode cylinders 17 of intermediate electrodes 7 by terminals 18. Intermediate electrodes 7 are located in the lower part of anode cylinders 17 fixed on supporting insulators 19.

To maintain vapor-dynamic conditions within narrow limits at various loads and overloads of the rectifier, housing 1 is provided with channels 20 having a variable cross-section throughout the height of the housing. This permits obtaining a specified rate of coolant flow (120 cm./sec. at the inlet and 70 cm./sec. at the outlet) and enables eliminating a film between the coolant and the walls of housing 1 whereby the temperature of the mercury condensate and of the coolant are practically equal.

Cathode cap 12, which is in the form of an upset bowl with double walls for the coolant to circulate therebetween, serves the same purpose. The coolant is delivered from the outside and is drained into the cooling system of housing 1 (direction of the coolant flow is shown by arrows in FIG. 1).

Placed in the evacuation system of the rectifier between housing 1 and mercury pump 21 is high-vacuum cock 22 provided with a electric control, the section of said cock corresponding to the dimensions of the pipes in the evacuation system. Cock 22 comprises magnetic circuit 23 (FIG. 2), coil 24, low-carbon steel core 25, sleeve 26, guide sleeve 27 made of non-magnetic steel, pressure spring 28, body 29, joint 30 and valve 31 with seal 32. Sleeve 26 is pressed against body 29 of cock 22 through vacuum-tight seal 33. When the rectifier is in operation, coil 24 is energized and core 25 is retracted, valve 31 thereby being open, and evacuation takes place in the direction shown by the arrows. When coil 24 is deenergized, valve 31 is automatically closed, owing to the action of spring 28.

Uniform pressure of valve 31 at its perimeter against body 29 is achieved with the help of joint 30 and elastic seal 32. Such an embodiment of the high-vacuum cock means better maintenance and higher reliability of the rectifier.

The seal of slot igniter 14 (FIG. 3) is made of soft iron wire 34, and the sealed surfaces of cathode 5 and slot igniter 14 are coated with hard metal 35 which will not deform when pressed by the sealing iron wire 34, hence the sealed surfaces of cathode 5 and slot igniter 14 need no additional treatment.

The above-described design of a high-voltage rectifier makes it possible to considerably increase the power and durability of the rectifier and to ensure its stable operation.

What is claimed is:

1. A high-voltage mercury arc rectifier comprising a housing with channels for the passage of a coolant, said channels being variable in section throughout the height of the housing to provide for the required rate of the coolant flow; a cathode cap located in said housing and constituted as an upset bowl with double walls for circulation of the coolant therebetween; an anode chamber located on said housing; a main anode insulator fixed on said anode chamber; a cathode located in the bottom of said housing; an anode located inside said anode chamber and main anode insulator; an anode cooler located inside said anode; intermediate electrodes located in said anode chamber; a filter located inside said housing; grids located between said intermediate electrodes and said filter; excitation anodes located inside said housing; a voltage divider connected with said intermediate electrodes; a slot igniter fixed on said cathode; and an evacuation system mounted on said housing.

2. A rectifier as claimed in claim 1, wherein said channels in the housing have an inlet and an outlet for the coolant, said channels having a sectional area which increases from the inlet to the outlet to provide an increased rate of flow at the inlet compared to the outlet.

3. A rectifier as claimed in claim 1, wherein said evacuation system comprises a high vacuum cock controlling evacuation of said housing, said cock including an electromagnetic drive comprising a magnetic circuit, a coil, a low carbon steel core within said coil, a guide sleeve for said core constituted of non-magnetic steel, a valve for controlling communication between said housing and a pump, means including a hinged joint connecting said valve and core, and spring means between the guide sleeve and the valve for urging the valve to closed position.

4. A rectifier as claimed in claim 1 comprising a seal between said slot igniter and the cathode including a soft mercury-resistant wire, said igniter and cathode including opposed portions in sealing contact with said wire, said portions being constituted of individual sections of relatively hard metal.

References Cited

UNITED STATES PATENTS

| | | | |
|---|---|---|---|
| 2,097,490 | 11/1937 | Kobel | 313—167 |
| 2,209,819 | 7/1940 | Kingdom | 313—35 |
| 2,228,846 | 1/1941 | Prince | 313—35 |
| 2,447,637 | 8/1948 | Colaiaco | 313—170 |

JAMES W. LAWRENCE, *Primary Examiner.*

R. F. HOSSFELD, *Assistant Examiner.*

U.S. Cl. X.R.

313—38, 170